2,877,161

REDUCTION OF 11,17-KETO STEROIDS BY TRICHOMONADS

Oldrich K. Sebek, Kalamazoo Township, Kalamazoo County, and Rhoda M. Michaels, Kalamazoo, Mich., assignors to The Upjohn Company, Kalamazoo, Mich., a corporation of Michigan No Drawing. Application September 17, 1956
Serial No. 610,399

12 Claims. (Cl. 195—51)

The present invention relates to a novel method for the production of certain 17β-hydroxy steroids, and is more particularly concerned with the reduction of 17-ketosteroids of the androstane, etiocholane and estrane series by animal microorganisms as well as such reduction with simultaneous dehydrogenation of the saturated 1,2-bond by the same animal microorganism in the presence of bacteria living in commensalism with the animal microorganism.

It is already known how to reduce 17-ketosteroids by chemical means, such as by hydrogen in its nascent state (e. g., sodium metal in ethanol, Fernholz, U. S. Patent 2,356,154) or by reduction with a metallic hydride, e. g. lithium aluminum hydride [Herr et al. J. Am. Chem. Soc. 75 5927 (1953)]. However in these reductions of 17-keto groups it is necessary to protect desired keto groups which occur in other positions to avoid simultaneous reductions of the desired keto groups. This can be accomplished by means of known carbonyl group reacting agents for example by forming ketals, enamines, semicarbazones or the like. Thus, the known chemical reductions necessitate at least two additional steps: formation of the protective group and a subsequent removal thereof. Since the 11-keto group is generally difficult to protect it does not react with most of the carbonyl group reacting agents, this group is often also reduced necessitating a subsequent oxidation while the 17-hydroxy group is protected by an ester group. Thus to produce 11-ketotestosterone from adrenosterone [cf. Herr, J. Am. Chem. Soc. 75, 5927 (1953)] six steps are required. In contrast, in the instant invention 11-ketotestosterone is produced from adrenosterone in one step.

The reduction of 17-ketosteroids with plant microorganisms (yeast) is known; for example, Herzog et al., J. Am. Chem. Soc. 75, 266 (1953) showed conversion of adrenosterone by yeast to 11-ketotestosterone in 62 percent yield and Mamoli and Vercellone, Ber. 70, 470 (1937) described reduction of androstene-dione to testosterone by yeast.

A disadvantage of the use of plant organism is the fact that they invariably split ester groups whenever present in the steroid. Thus from estrone esters Mamoli, Ber. 71, 2696 (1938) obtained free estradiol. Free estrone was not reduced at all by yeast. It has now been found that animal organisms of the family Trichomonadidae, especially of the genera Trichomonas, Tritrichomonas and Pentatrichomonas and in particular the species *Trichomonas gallinae* and *Tritrichomonas foetus* are useful for the selective reduction of the 17-keto group of 17-keto steroids to produce stereo—specifically the corresponding 17β-hydroxysteroid.

According to the classification system of Kudo, Protozoology, Charles C. Thomas Co., Springfield, Illinois, 1946, the family Trichomonadidae belongs to the suborder Monomonadina, which belongs to the order Polymastigina of subclass Zoomastigina, of class Mastigophora, subphylum Plasmodroma and phylum Protozoa. Other authors, e. g., Banner B. Morgan and Philip Hawkins, Veterinary Protozoology, Burgess Publishing Co., Minneapolis, Min., 1952, classify the family Trichomonadidae as part of the order Trichomonadida. In this specification the nomenclature of Kudo will be used.

It is an object of the instant invention to provide a new process for the reduction of 17-keto groups and 17-keto-steroids such as 17-ketoandrostanes, 17-ketoestranes and 17-ketoetiocholanes. It is also an object of the present invention to provide such a process of reduction of a 17-keto group of 17-ketosteroids with simultaneous dehydrogenation of a saturated bond in the 1,2-position of the steroid, to form an unsaturated double bond between the carbon atoms 1 and 2, by the simultaneous action of protozoa of the family Trichomonadidae in the presence of a plant organism of the genus Corynebacterium. Other objects will be apparent to those skilled in the art to which this invention pertains.

The present invention provides an easy method to reduce the 17-keto group in 17-ketosteroids to the corresponding 17β-hydroxyl group and thereby produce a more active compound such as testosterone from androstenedione, 11-ketotestosterone from adrenosterone, estradiol from estrone and the like. The instant combination of Trichomonas and Corynebacterium is also useful to produce dehydrogenation at the 1,2-carbon atoms simultaneously with the reduction of the 11-keto group due to the unique fact that the Trichomonas can exist in commensalism with Corynebacterium under more or less anerobic conditions. For example, Trichomonas in mixtures with Corynebacterium, in a one-step operation, converted 4-androstene-3,17-dione to 1-dehydrotestosterone, adrenosterone to 1-dehydro-11-ketotestosterone and 11β-hydroxy-nor-4-androstene-3,17-dione to 11β-hydroxyestradiol, which compounds have increased androgenic and anabolic activity or increased anabolic-androgenic ratio, or are otherwise more desirable such as, for instance, estradiol which is used more than the 17-keto analogue, estrone.

The starting materials of the instant reaction are 17-ketosteroids, such as compounds belonging to the 17-keto-androstane class including those 17-ketoandrostanes having double bonds for example in the 4,5, in the 5,6 or in the 1,2-position such as, for example, 4-androstene-3,17-dione, 1,4-androstadiene-3,17-dione, epi-dehydroandrosterone, 11β-hydroxy-4-androstene-3,17-dione, adrenosterone, androstane-3,17-dione, 11α-hydroxy-4-androstene-3,17-dione, 3β-acetoxy-5-androsten-17-one; 17-ketoetiocholanes, such as etiocholane-3,17-dione, 3α-hydroxyetiocholan-17-one, 3α-acetoxy-etiocholan-17-one, 3β-acetoxy-etiocholan-17-one; 17-keto-estrane compounds including those 17-ketoestranes having double bonds in positions 1, 3, 5 or 4 such as estrane-3,17-dione, 4-estrene-3,17-dione, 11β - hydroxy - 4 - estrene - 3,17 - dione, 4 - estrene-3,11,17-trione (noradrenosterone), estrone, or the like.

The method of the present invention, in its broader aspects, consists in subjecting a starting compound having a 17-keto group such as the starting compounds named above to the reducing action of anerobically grown genera of the family Trichomonadidae, especially the genera Trichomonas, Tritrichomonas, and Pentatrichomonas. Among the species useful in this conversion are the known *Trichomonas gallinae*, *Trichomonas elongata* (buccalis), *Trichomonas vaginalis*, *Trichomonas linearis*, *Trichomonas termitis*, *Trichomonas anseri*, and the like; *Tritrichomonas foetus*, *Tritrichomonas brevicollis*, *Tritrichomonas eberthi*, *Tritrichomonas fecalis* and the like; and *Pentatrichomonas gallinarium*, *Pentatrichomonas hominis*, with *Trichomonas gallinae* and *Tritrichomonas foetus* preferred.

If in addition to the reduction of a 17-keto group, dehydrogenation at the 1,2-carbon atoms is desired to form a 1-dehydro-17-hydroxysteroid, belonging to the androstane, estrane or etiocholane classes, the selected Trichomonas, Tritrichomonas or Pentatrichomonas species is grown anaerobically or nearly anaerobically in the presence of Corynebacterium such as *C. equi* ATCC 10146, *C. simplex* ATCC 6946, *C. pseudodiphtheriticum* (hoffmanii) ATCC 6981 or *C. renale* ATCC 10848 and the like. In the preferred embodiment of this aspect of the present invention, whenever simultaneous reduction of the 17-keto group and dehydrogenation of the steroid on the 1,2-position is desired, the combination of *Trichomonas gallinae* or *Trichomonas foetus* with *Corynebacterium simplex* or *Corynebacterium equi* is used.

The trichomonads are grown under conditions well known in the art [cf., for example, André Lwoff, Biochemistry and Physiology of Protozoa, volume I, Academic Press Inc., Publishers, New York, 1951, pages 150 to 174; Banner B. Morgan, Veterinary Protozoology, Burgress Publishing Company, Minneapolis, Minn., revised edition 1952].

In regard to the medium or menstruum for the growth of Trichomonas, it is necessary to provide basic food materials in easily assimilable form, such as assimilable nitrogen-containing nutrients, e. g., proteins, beef broth (peptonized), liver extracts and liver-infusion extractions, heart infusion, pancreatic digest of casein, aminoacids, lysine, asparagine, sterile blood serum, and defibrinated blood, gelatin, eggs in dispersed form, agar, guanine, xanthine, horse serum, and the like; assimilable carbon compounds, e. g., carbohydrates, e. g., glucose, lactose, maltose, fructose, sucrose, and other sugars, dextrin, soluble starches, ground potato, wheat, corn, and the like, and soluble glycogen, and the like.

As mineral constituents, the medium may contain, naturally present or added, available calcium, sodium, potassium, copper, cobalt, iron, gallium, magnesium, manganese, arsenic, molybdenum, vanadium, and other metals. Sulfur may be provided by the addition of cystine, alkali thioglycollate, thiamine, biotin, or the like; phosphorus by the addition of soluble phosphates, potassium acid phosphate, as lecithin, cephalin, ovovitelline, phytine, or the like, boron and iodine in traces when desirable.

For the growth of Trichomonas, necessary vitamins should desirably be added, such as ascorbic acid (vitamin C). Other vitamins of importance for optimum growth comprise vitamin $B_1$ and $B_{12}$, pyridoxine, vitamin A and D. Cholesterol is desirable for several Trichomonas species, especially *T. gallinae* and *T. foetus*. Other desirable growth factors, often added, include: folic acid, glutamic acid, linolenic acid, α-tocopherol, calcium pantothenate, α-carotene, riboflavin, choline, estradiol, ergosterol, and the like.

Nutritional differences between species of Trichomonas are quite pronounced as is known; thus, while *Trichomonas gallinae* and *T. foetus* can utilize such sugars as galactose, fructose, lactose, *Trichomonas vaginalis* is unable to assimilate these sugars.

The nutrient solution should also contain buffer substances suitable for the required growth conditions of the selected Trichomonas species. Thus according to Lwoff (loc cit.) *Trichomonas gallinae* are most viable at a pH of about 7 (e. g., with a calcium carbonate buffer present in the medium) and die at a pH of about 4.5 which is reached after five to six days of cultivation in an unbuffered medium. Best pH for *Trichomonas vaginalis* is between 5.4 to six, according to the same author.

Similarly for optimum growth conditions of Trichomonas, it is necessary to regulate the temperature closely to the one best suitable for the selected species. Most species and strains are viable and multiply between 32 to forty degrees centigrade, with an optimum temperature for *Trichomonas gallinae, T. vaginalis* and *T. colubrorum* of 37 degrees centigrade, for *Trichomonas foetus*, Witte's strain V, Riedmüller's strain 78 and Glaser's strain G between 32 to 37 degrees centigrade while Witte's strain IV has an optimal temperature of only 28 degrees (Lwoff loc. cit). Thus, the optimum temperature conditions for most species in vitro are either near or below the average body temperature of warm blooded (mammal or bird) hosts, seldom above the temperature of the host.

In the instant invention the medium which has been successfully used consisted of pancreatic digest of casein, cystine, yeast extract, sodium thioglycollate, agar, horse serum, and glucose. When Corynebacterium was used in conjunction with Trichomonas the Corynebacterium and the Trichomonas were simultaneously inoculated in the nutrient medium. Corynebacterium, especially *C. equi* ATCC 10146 and *C. simplex* ATCC 6946, increases the life-time of the trichomonad and allows simultaneously a two to five-fold increase in the population number of Trichomonas per volume unit. Since the trichomonads are cultivated in the absence of air and are also cultivated in the absence of air when Corynebacterium was present, it was surprising to find that the Corynebacterium in the absence of air can produce a dehydrogenation which may be considered an oxidation reaction, while at the same time the Trichomonas produces reduction of 17-keto groups.

The general procedure used in the instant invention comprises inoculating a prepared medium with Trichomonas and allowing an incubation time sufficient to raise a population between two to four million per milliliter. This is usually obtained during a period of one to two days. The culture is grown at a temperature suitable for optimum growth, for example, about 37 degrees centigrade for *Trichomonas foetus* and *Trichomonas gallinae*. However, temperatures between 32 and forty degrees centigrade may be used for the cultivation of the Trichomonas species. After the population has grown to a number of two–four million per milliliter the selected steroid is added, previously dissolved in an appropriate solvent, non-toxic to the microorganism, for example, propylene glycol, aqueous ethanol or the like. The concentration of the solvent in the medium should be low, preferably in the neighborhood of one percent to avoid the growth inhibition of the Trichomonas. The steroid is allowed to remain in contact with the selected Trichomonas species for generally one day. Occasionally the reaction time may be extended or diminished as deemed necessary for the particular reaction and thus may range from twelve to 72 hours. After the reaction is terminated, the contents of the flask are sterilized, as by killing the organisms present with steam heat. Subsequently the total fermentation material is extracted with water-immiscible solvents such as methylene chloride, ethylene dichloride, chloroform, carbon tetrachloride, benzene, hexanes, toluene, ether, or the like. The steroids in the extracts are recovered by conventional means such as evaporation of the solvent and purified as by recrystallization and chromatography, as deemed necessary. If a more exhaustive recovery is desired, the following procedure can be followed: after heating the fermentation mixture, the mixture is filtered to separate the beer from the solids. The beer is extracted with water-immiscible solvents as mentioned above, and the solids, derived from the food provided and the destroyed microorganisms, washed and extracted separately with acetone, Skellysolve B-hexanes, methylene chloride, chloroform, or other convenient solvents. The thus obtained extractives are then combined with the extractives from the beer, and together are evaporated and treated as shown before to isolate and purify the steroids.

If the reaction is run in the presence of a selected Corynebacterium such as *Corynebacterium equi* or *Corynebacterium simplex*, the procedure is the same as shown above. The Corynebacterium and Trichomonas are inoculated and cultivated together under the same conditions as described.

The following examples are illustrative of the process and products of the present invention, but are not to be construed as limiting.

EXAMPLE 1

*Testosterone from 4-androstene-3,17-dione*

A medium was prepared containing per one liter of solution fifteen grams of pancreatic digest of casein, 0.5 gram of cystine, five grams of yeast extract, five grams of dextrose, 2.5 grams of sodium chloride, 0.5 gram of sodium thioglycollate, 0.75 gram of agar and five percent of horse serum. 100 milliliters of this medium was then incubated with *Trichomonas gallinae* at 37 degrees for a period of 24 hours after which time the population reached between two and four million animals per milliliter. To the inoculated medium, thus obtained, a sterile solution of 4-androstene-3,17-dione, sterilized under fifteen pounds of steam pressure per square inch for twenty minutes was added. The addition was made by dissolving ten milligrams of the 4-androstene-3,17-dione in 0.5 milliliter of propylene glycol. The material was aseptically pipetted and the incubation continued at 37 degrees for another 24 hour period. Thereafter, the flask containing the fermentation mixture was heated on a steam bath for fifteen to twenty minutes, the beer separated from the solid material by filtration and the beer extracted with three 25-milliliter portions of methylene chloride and the solids extracted three times with ten-milliliter portions of hot acetone. The extracts were combined, the solvent evaporated, the residue redissolved in acetone and filtered through a paper filter, evaporated to dryness and recrystallized three times from methanol to give 6.5 milligrams of testosterone.

In the same manner as shown above, 800 milligrams of 4-androstene-3,17-dione were dissolved in twenty milliliters of propylene glycol and added to four liters of a medium prepared as above. The material was allowed to react in the fermentation solution for a period of 24 hours and thereafter the mixture was sterilized by steam heat. The solids were separated by filtration from the beer and the beer extracted by four 1.5-liter portions of methylene chloride. The solids were extracted by three washings with 200-milliliter portions of acetone. The acetone and methylene chloride extracts were combined, evaporated, and the thus obtained material chromatographed through Florisil anhydrous magnesium silicate (seventy grams) taking 250-milliliter fractions as follows:

| Fraction | Solvent |
| --- | --- |
| 1 | Skellysolve B hexanes. |
| 2 | Skellysolve B hexane:acetone 98:2. |
| 3 | Skellysolve B hexane:acetone 97:3. |
| 4 | Skellysolve B hexane:acetone 96:4. |
| 5 | Skellysolve B hexane:acetone 96:4. |
| 6-8 | Skellysolve B hexane:acetone 95:5. |
| 9-12 | Skellysolve B hexane:acetone 94:6. |
| 13 | Skellysolve B hexane:acetone 93:7. |
| 14 | Skellysolve B hexane:acetone 93:7. |
| 15 | Skellysolve B hexane:acetone 90:10. |
| 16 | Acetone 100%. |

Fractions 5 through 13 were combined, evaporated and the material recrystallized from methanol to give 730 milligrams of testosterone.

EXAMPLE 2

*11-ketotestosterone from adrenosterone*

In the same manner as shown in Example 1, 800 milligrams of adrenosterone were treated with *Trichomonas gallinae* in the same type of medium to give 755 milligrams of 11-ketotestosterone.

EXAMPLE 3

In the same manner as shown in Example 1, but using *Tritrichomonas foetus* instead of *Trichomonas gallinae*, adrenosterone was converted in 95 percent yield by papergram analysis to 11-ketotestosterone.

EXAMPLE 4

*1-dehydrostestosterone*

In the same manner as given in Example 1, 1,4-androstadiene-3,17-dione was converted with *Trichomonas gallinae* in 87 percent yield to 1-dehydrotestosterone.

Using *Pentatrichomonas hominis*, *Pentatrichomonas gallinarum* or *Trichomonas vaginalis* instead of *Trichomonas gallinae* also produced 1-dehydrotestosterone from 1,4-androstadiene-3,17-dione.

EXAMPLE 5

*11β-hydroxytestosterone*

In the same manner given in Example 1, 11β-hydroxy-4-androstene-3,17-dione was converted to 11β-hydroxytestosterone in 86 percent yield with *Trichomonas gallinae*.

EXAMPLE 6

*3β-acetoxy-17β-hydroxy-5-androstene*

In the same manner given in Example 1, 3β-acetoxy-5-androstene-17-one was reacted with *Trichomonas gallinae* to give in 71 percent yield 3β-acetoxy-17β-hydroxy-5-androstene. This conversion is distinctly different from any similar reduction by a plant organism (yeast), since the plant organism in almost 100 percent efficiency hydrolyze ester groups present in steroids.

EXAMPLE 7

*11α,17β-dihydroxy-4-androstene-3-one*

In the same manner as given in Example 1, 11α-hydroxy-4-androstene-3,17-dione was converted with *Trichomonas gallinae* to 11α,17β-dihydroxy-4-androsten-3-one in ninety percent yield.

In the same manner but using *Pentatrichomonas gallinarum* for *Trichomonas gallinae* 11α,17β-dihydroxy-4-androsten-3-one was obtained from 11α-hydroxy-4-androstene-3,17-dione.

EXAMPLE 8

*3β,17β-dihydroxy-5-androstene*

In the same manner as given in Example 1, 3β-hydroxy-5-androsten-17-one was converted to 3β,17β-dihydroxy-5-androstene with *Trichomonas foetus* in 86 percent yield.

EXAMPLE 9

*3α,17β-dihydroxy-etiocholane*

In the same manner as given in Example 1, 3α-hydroxy-etiocholan-17-one was subjected to fermentation with *Trichomonas vaginalis* to give 3α,17β-dihydroxy-etiocholane with folliculoid activity.

EXAMPLE 10

*Estradiol from estrone*

In the same manner given in Example 1, estrone was fermented in the presence of *Tirchomonas gallinae* to give in 77 percent yield estradiol.

In the same manner as given in Examples 1 through 10, submitting other 17-ketosteroids to fermentation by *Trichomonas gallinae*, *Trichomonas foetus*, (*Tritrichomonas foetus*) and other species selected from the genera Trichomonas, Tritrichomonas and Pentatrichomonas produces the corresponding 17-hydroxy steroids such as 3α,17β-dihydroxy-etiocholane from 3α-hydroxy-etiocholan-17-one, 3α-acetoxy-17β-hydroxy-etiocholane from 3α-acetoxy-etiocholan-17-one, 3β-acetoxy-17β-hydroxy-etiocholane from 3β-acetoxy-etiocholan - 17 - one, nortestosterone from 4-estrene-3,17-dione, 11β-hydroxynortestosterone from 11β-hydroxy-4-esterene-3,17-dione, 11-ketonortestosterone from 4-estrene-3,11,17-trione, and the like.

Example 11

1-dehydro-11-ketotestosterone from adrenosterone

In 100 milliliters of a medium consisting of 1.5 grams of casein, 0.5 gram of yeast extract, 0.5 gram of dextrose, 0.25 gram of sodium chloride, 0.05 gram of sodium thioglycollate, 0.075 gram of agar, 0.05 gram of cystine and containing five percent of horse serum *Corynebacterium simplex* ATCC 6946 and *Trichomonas gallinae* were grown at 37 degrees for a period of 24 hours. After that time, ten milligrams of 4-androstene-3,11,17-trione (adrenosterone), dissolved in one milliliter of propylene glycol, was added and the incubation continued at 37 degrees for one additional day to give 1-dehydro-11-ketotestosterone.

Example 12

1-dehydrotestosterone

In the same manner given in Example 11, 4-androstene-3,17-dione was converted with *Corynebacterium equi* ATCC 10146 and *Trichomonas foetus* to give 1-dehydrotestosterone, which was isolated by extraction from the fermentation mixture with methylene chloride and purified by chromatography with acetone and Skellysolve B hexane as shown in Example 1.

Example 13

11β-hydroxyestradiol from 11β-hydroxy-4-estrene-3,17-dione

In the same manner as given in Example 11, *Corynebacterium equi* and *Trichomonas gallinae* were grown together for a period of 36 hours and thereafter the steroid, 11β-hydroxy-4-estrene-3,17-dione was added. The mixture was incubated for another period of 36 hours, thereupon heated under steam bath and extracted with methylene chloride as shown in Example 1 to give 11β-hydroxyestradiol.

Example 14

11-ketoestradiol

In the same manner given in Example 11, *Corynebacterium equi* and *Trichomonas foetus* were grown together for a period of 36 hours whereafter noradrenosterone (4-estrene-3,11,17-trione) was added and the mixture grown for a period of 48 hours. The mixture was then heated on steam bath for a period of thirty minutes and extracted with methylene chloride to give after evaporation of the extract 11-ketoestradiol.

Example 15

1-dehydro-11β-hydroxytestosterone

In the same manner given in Example 11, *Corynebacterium simplex* and *Trichomonas gallinae* were grown together for a period of 24 hours and thereafter 11β-hydroxy-4-androstene-3,17-dione was added to give 1-dehydro-11β-hydroxytestosterone, which was isolated and purified as shown in Example 1.

In the same manner as given in Examples 11 through 15, other 1-dehydro-17β-hydroxy steroids can be produced from the corresponding 17-ketosteroids by simultaneous fermentation of the starting 17-ketosteroid with a species of Corynebacterium and a species selected from the family Trichomonadidae. Preferred are the combinations of *Corynebacterium simplex* and *Corynebacterium equi* with *Trichomonas gallinae* and *Tritrichomonas foetus*. Representative compounds, thus produced, include 1-dehydro-17-hydroxyetiocholan-3-one from etiocholane-3,17-dione, 1,5-androstadiene-3β,17β-diol from epi-dehydroandrosterone, 1-dehydro-17β-hydroxyandrostan-3-one from androstane-3,17-dione, 1-dehydro-11α-hydroxytestosterone from 11α-hydroxy-4-androstene-3,17-dione, 11α-hydroxy-estradiol from 11α-hydroxy-4-estrene-3,17-dione, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of 17β-hydroxy steroids which comprises: cultivating a species of the protozoan family Trichomonadidae selected from the genera Trichomonas, Tritrichomonas and Pentatrichomonas in a nutrient medium, in the presence of a 17-ketosteroid selected from the group consisting of 17-ketoandrostane, 17-ketoetiocholane and 17-ketoestrane to convert the 17-keto group of said 17-keto steroid to a 17β-hydroxy group.

2. A process for the production of 17β-hydroxy steroids which comprises: cultivating a species of the protozoan family Trichomonadidae selected from the genera Trichomonas, Tritrichomonas and Pentatrichomonas in a nutrient medium, containing assimilable non-steroidal carbon, nitrogen, sulfur and phosphorus, and a 17-ketosteroid selected from the group consisting of 17-ketoandrostane, 17-ketoetiocholane and 17-ketoestrane to obtain the corresponding 17β-hydroxy steroid and isolating the thus obtained 17β-hydroxy steroid.

3. A process for the production of 17β-hydroxy steroids which comprises: cultivating *Trichomonas gallinae* in a nutrient medium containing assimilable non-steroidal carbon, nitrogen, sulfur and phosphorus, and a 17-ketosteroid selected from the group consisting of 17-ketoandrostane, 17-ketoetiocholane and 17-ketoestrane compounds to obtain the corresponding 17β-hydroxy steroids and isolating the thus obtained 17β-hydroxy steroids.

4. A process for the production of 17β-hydroxy steroids which comprises: cultivating *Tritrichomonas foetus* in a nutrient medium containing assimilable non-steroidal carbon, nitrogen, sulfur and phosphorus, and a 17-ketosteroid selected from the group consisting of 17-ketoandrostane, 17-ketoetiocholane and 17-ketoestrane compounds to obtain the corresponding 17β-hydroxy steroids and isolating the thus obtained 17β-hydroxy steroids.

5. A process for the production of testosterone which comprises: cultivating a species of the family Trichomonadidae selected from the genera Trichomonas, Tritrichomonas and Pentatrichomonas in a nutrient medium containing assimilable non-steroidal carbon, nitrogen, sulfur and phosphorus, and 4-androstene-3,17-dione to obtain testosterone and isolating the thus-prepared testosterone.

6. A process for the production of testosterone which comprises: cultivating *Trichomonas gallinae* in a nutrient medium containing assimilable non-steroidal carbon, nitrogen, sulfur and phosphorus, and 4-androstene-3,17-dione to obtain testosterone and isolating the thus-prepared testosterone.

7. A process for the production of 11-ketotestosterone which comprises: cultivating a species of the family Trichomonadidae selected from the genera Trichomonas, Tritrichomonas and Pentatrichomonas in a nutrient medium containing assimilable non-steroidal carbon, nitrogen, sulfur and phosphorus and adrenosterone to obtain 11-ketotestosterone and isolating the thus-prepared 11-ketotestosterone.

8. A process for the production of 11-ketotestosterone which comprises: cultivating *Trichomonas gallinae* in a nutrient medium containing assimilable non-steroidal carbon, nitrogen, sulfur and phosphorus, and adrenosterone to obtain 11-ketotestosterone and isolating the thus-prepared 11-ketotestosterone.

9. A process for the production of 1-dehydro-17β-hydroxy steroids which comprises: cultivating a species of the protozoan family Trichomonadidae selected from the genera Trichomonas, Tritrichomonas and Pentatrichomonas and a Corynebacterium selected from the species *Corynebacterium simplex* and *Corynebacterium equi*, in a nutrient medium containing assimilable non-steroidal carbon, nitrogen, sulfur and phosphorus, and a 17-ketosteroid, selected from the group of 17-ketoandrostane, 17-ketoetiocholane and 17-ketoestrane to effect simultaneous dehydrogenation on the 1,2-position and reduction of the 17-keto group to a 17β-hydroxy group, and isolating the thus-obtained corresponding 1-dehydro-17β-hydroxy steroid.

10. A process for the production of 1-dehydrotestosterone which comprises: cultivating *Trichomonas foetus* and *Corynebacterium equi* in a nutrient medium containing assimilable non-steroidal carbon, nitrogen, sulfur and phosphorus, and 4-androstene-3,17-dione to effect simultaneous dehydrogenation on the 1,2-position and reduction of the 17-keto group to a 17βhydroxy group and isolating the thus produced 1-dehydrotestosterone.

11. A process for the production of 11β-hydroxyestradiol which comprises: cultivating the protozoan *Trichomonas gallinae* and *Corynebacterium equi* in a nutrient medium containing assimilable non-steroidal carbon, nitrogen, sulfur and phosphorus, and 11β-hydroxy-4-estrene-3,17-dione to effect simultaneous dehydrogenation on the 1,2-position and reduction of the 17-keto group to a 17β-hydroxy group and isolating the thus produced 11β-hydroxyestradiol.

12. A process for the production of 1-dehydro-11-ketotestosterone which comprises: cultivating the protozoan *Trichomonas gallinae* and *Corynebacterium simplex* in a nutrient medium containing assimilable non-steroidal carbon, nitrogen, sulfur and phosphorus, and adrenosterone to effect simultaneous dehydrogenation on the 1,2-position and reduction of the 17-keto group to a 17β-hydroxy group and isolating the thus produced 1-dehydro-11-ketotestosterone.

References Cited in the file of this patent

Nobile et al.: Jour. Am. Chem. Soc. 77 (1955), p. 4184.

Vitamins and Hormones, XIV, Academic Press, 1956, pp. 391 to 394, 397.